United States Patent
Strongin et al.

(10) Patent No.: US 6,185,637 B1
(45) Date of Patent: Feb. 6, 2001

(54) SYSTEM FOR IMPLEMENTING AN ADAPTIVE BURST LENGTH FOR BURST MODE TRANSACTIONS OF A MEMORY BY MONITORING RESPONSE TIMES FOR DIFFERENT MEMORY REGIONS

(75) Inventors: Geoffrey S. S. Strongin, Austin; Norm M Hack, Pflugerville, both of TX (US)

(73) Assignee: Advanced Micro Devices, Inc., Sunnyvale, CA (US)

(*) Notice: Under 35 U.S.C. 154(b), the term of this patent shall be extended for 0 days.

(21) Appl. No.: 09/060,844

(22) Filed: Apr. 15, 1998

(51) Int. Cl.[7] .................................................. G06F 13/00
(52) U.S. Cl. .......................... 710/35; 710/18; 710/19; 710/33; 710/58; 710/60; 711/167
(58) Field of Search .................................. 712/1; 710/110, 710/35, 66, 241, 18, 19, 33, 58, 60; 711/118, 123, 138, 167; 714/748

(56) References Cited

U.S. PATENT DOCUMENTS

| | | | |
|---|---|---|---|
| 5,274,625 | * 12/1993 | Derby et al. | 370/233 |
| 5,289,583 | * 2/1994 | Fischer et al. | 710/241 |
| 5,469,398 | * 11/1995 | Scott et al. | 365/221 |
| 5,513,320 | * 4/1996 | Young et al. | 709/236 |
| 5,664,230 | * 9/1997 | Leyrer et al. | 710/66 |
| 5,712,860 | * 1/1998 | Hardin | 714/748 |
| 5,768,622 | * 6/1998 | Lory et al. | 710/35 |
| 5,907,689 | * 5/1999 | Tavallaei | 710/110 |
| 5,940,344 | * 8/1999 | Murai et al. | 365/233 |
| 5,970,069 | * 10/1999 | Kumar et al. | 370/402 |
| 5,999,197 | * 12/1999 | Satoh et al. | 345/515 |
| 6,009,489 | * 12/1999 | Mergard | 710/107 |

* cited by examiner

Primary Examiner—Meng-Ai T. An
Assistant Examiner—Nabil El-Hady
(74) Attorney, Agent, or Firm—Conley, Rose & Tayon, PC; B. Noël Kivlin

(57) ABSTRACT

A system is disclosed for improving the efficiency of data transactions by permitting the length of burst transactions to be modified based upon system performance. A bus interface unit monitors the response times of memory devices, and, if WAIT periods are required before the memory device responds, the bus interface unit increases the length of the burst. Preferably, the bus interface unit includes a table of historical response times of various memory ranges, and determines an optimal burst length for each memory range. When a data transaction is made to a particular memory location, the BIU accesses the table and asserts a BURST signal for a sufficient period of time to accomplish the optimal burst length. After the optimal burst length has been reached in the existing memory transaction, the BURST signal is deasserted to end the burst cycle.

11 Claims, 2 Drawing Sheets

| ADDRESS RANGE | LATENCY (#OF WAIT STATES) | BURST LENGTH (BYTES) |
|---|---|---|
| 00000000-0000FFFF | 4 | 16 |
| 00010000-000FFFFF | 2 | 8 |
| 00100000 -001FFFFF | 8 | 36 |
| 0100000-100000000 | 10 | 64 |

↘ 250

| LATENCY(# OF WAIT STATES) | BURST LENGTH (BYTES) |
|---|---|
| 0-1 | 4 |
| 2-3 | 8 |
| 4-5 | 16 |
| 6-7 | 24 |
| 8-9 | 36 |
| 10-11 | 64 |
| 12+ | 128 |

↘ 225

| ADDRESS RANGE | LATENCY (#OF WAIT STATES) | BURST LENGTH (BYTES) |
|---|---|---|
| 00000000-0000FFFF | 4 | 16 |
| 00010000-000FFFFF | 2 | 8 |
| 00100000 -001FFFFF | 8 | 36 |
| 0100000-100000000 | 10 | 64 |

| LATENCY(# OF WAIT STATES) | BURST LENGTH (BYTES) |
|---|---|
| 0-1 | 4 |
| 2-3 | 8 |
| 4-5 | 16 |
| 6-7 | 24 |
| 8-9 | 36 |
| 10-11 | 64 |
| 12+ | 128 |

| AB | X | X | X | X | X | X | X |
|---|---|---|---|---|---|---|---|

SYSTEM FOR IMPLEMENTING AN ADAPTIVE BURST LENGTH FOR BURST MODE TRANSACTIONS OF A MEMORY BY MONITORING RESPONSE TIMES FOR DIFFERENT MEMORY REGIONS

BACKGROUND OF THE INVENTION

1. Field of the Invention

The present invention generally relates to computer systems which include memory devices that are subject to read and write transactions by a central processing unit (CPU) or other system device. Still more particularly, the present invention relates to a computer system implementation in which data is transferred between memory and the CPU in bursts Still more particularly, the present invention relates to a system in which the burst length of the data stream can be modified based upon a variety of criteria to improve the efficiency of the computer system.

2. Description of the Relevant Art

For most computer systems, the number of clock cycles required for a data access to a memory device depends upon the component accessing the memory and the speed of the memory unit. Most of the memory devices in a computer system are slow relative to the clock speed of the central processing unit (CPU). As a result, the CPU is forced to enter wait states when seeking data from the slower memory devices. Because of the relative slowness of most memory devices, the efficiency of the CPU can be severely compromised. As the operating speed of processors increases and as new generations of processors evolve, it is advantageous to minimize wait states in memory transactions to fully exploit the capabilities of these new processors.

One technique which has been used and which has gained widespread acceptance in computer systems is the use of one or more high speed cache memory devices. Typically, the cache memory is placed intermediate the CPU and system memory, and is used to store frequently used, or recently used, data. While cache memory devices have reduced processor latency times in memory transactions, a problem still exist with latency in memory transactions, especially for memory transactions to other memory sub-systems, such as the system memory.

Another technique which has been used to reduce processor latency in memory transactions is to increase the amount of information transferred in each memory access. Protocols exist for bursting data streams under certain conditions in some systems, such as the PCI (Peripheral Component Interconnect) bus. The PCI bus has a protocol which permits data to be transferred in a burst mode.

The burst mode feature allows reads or writes to consecutive memory locations at high speed, via burst cycles. The normal procedure for reading or writing from memory is that the CPU in a first clock cycle generates the address signals on the address bus, and then in the following clock cycle, data is transferred to or from system memory. Since the PCI data bus, for example, is 32-bits wide, a total of four bytes (each byte has 8 bits) of data can be read or written by the CPU for every two clock cycles. Each set of four bytes transferred on the data bus is referred to as a "double word." In burst mode, additional sequential double words may be transferred during subsequent clock cycles without intervening address phases. For example, a total of four double words can be read into the CPU using only five clock cycles because only the starting address is sent out on the address bus, and subsequently the first double word of data is read during the second cycle, the next double word of data during the third cycle, and so on. Thus, where a normal transfer of four double words would take at least eight clock cycles, the burst mode permits four doublewords to be transferred in five clock cycles. Burst mode operation thereby accommodates relatively high data transfer rates, and significantly reduces the latency involved in a memory transfer.

Despite the advantages of operating in burst mode, the burst mode feature has certain limitations. One limitation inherent in burst mode transfers is that the burst mode length typically is fixed, and cannot be altered. In addition, the burst mode feature is not responsive to actual latency conditions in the system. In the devices and busses which use burst mode transactions, the burst length typically is fixed by the system designer. The optimal burst length value, however, is dependent upon a number of factors that typically are not known during the design process. Consequently, a system designer does not have all of the information necessary to make a fully informed decision regarding the optimal burst length for a particular memory device.

SUMMARY OF THE INVENTION

The present invention solves the shortcomings and deficiencies of the prior art by providing a computer system that includes a bus interface unit (also referred to as "BIU") to orchestrate data accesses between memory devices and a central processing unit (CPU) core. Preferably, the BIU includes a register with a dedicated bit to indicate whether the adaptive burst mode feature is to be implemented by the BIU. The bus interface unit preferably includes a table of historical data on the latencies experienced for different memory regions. A second table also preferably is provided which indicates an optimal burst length for particular latency periods (which may be measured by WAIT states, or other criteria). The optimal burst length for a latency period can be fixed by the system designer, or can be modified during system operation by a programmer or through a self-executing algorithm. The table of historical data preferably is accumulated by the bus interface unit based on observations of signals appearing on the CPU local bus and system bus. When a particular access then is routed through the bus interface unit to a particular memory range, the BIU implements a burst mode transfer with a burst length specified in the look-up table.

The actual implementation of the burst transfer may be made through the use of a BURST control signal. According to this embodiment, the memory continues burst data to as long as the BURST line remains asserted by the BIU. When the BURST line is deasserted, the target memory unit completes the burst transaction. The BIU determines how long to assert the BURST signal based upon the look-up table. Alternatively, the length of the burst data transfer may be indicated by signaling between the BIU and target memory device prior to the time that the memory device drives out the desired data. In this embodiment, the BIU could indicate to the memory device that a burst data transfer is desired, and the memory device could respond with the expected response time, from which the BIU determines the optimal burst length.

The historical data to be monitored preferably includes WAIT states, which define the length of time between the initiation of a memory transaction and the response of the first data item from the targeted memory device. The BIU then stores, as a running count of clock signals, the WAIT period. In the preferred embodiment, the BIU stores the WAIT periods on an address range basis. Alternatively, the WAIT periods (or other latency measurement) can be stored on a component by component basis. The look-up table preferably includes x bits to define the address range, y bits to define the latency period, and z bits to define the optimal burst length.

In addition to the WAIT periods, the BIU also may look at other criteria when assigning the optimal burst length. For example, the BIU can monitor the number of accesses to a memory range within a predetermined period as an indication of whether to increase the length of the data transfer. Other criteria which can be monitored by the BIU include (1) the internal state of the CPU, such as pending load, fetch, and store requests; (2) historical data regarding previous execution history; (3) the content of memory responses; and (4) the current state of any CPU special mode bits.

BRIEF DESCRIPTION OF THE DRAWINGS

For a more detailed description of the preferred embodiment of the present invention, reference will now be made to the accompanying drawings, wherein:

FIG. 2 depicts a look-up table in the bus interface unit of FIG. 1, which is used by the bus interface unit to determine a burst length for each memory address range;

FIG. 3 shows a look-up table for use by the bus interface unit in determining burst length based upon latency;

FIG. 4 depicts an exemplary register for the bus interface unit which functions to indicate whether an adaptive burst mode is to be implemented.

Figure 1:
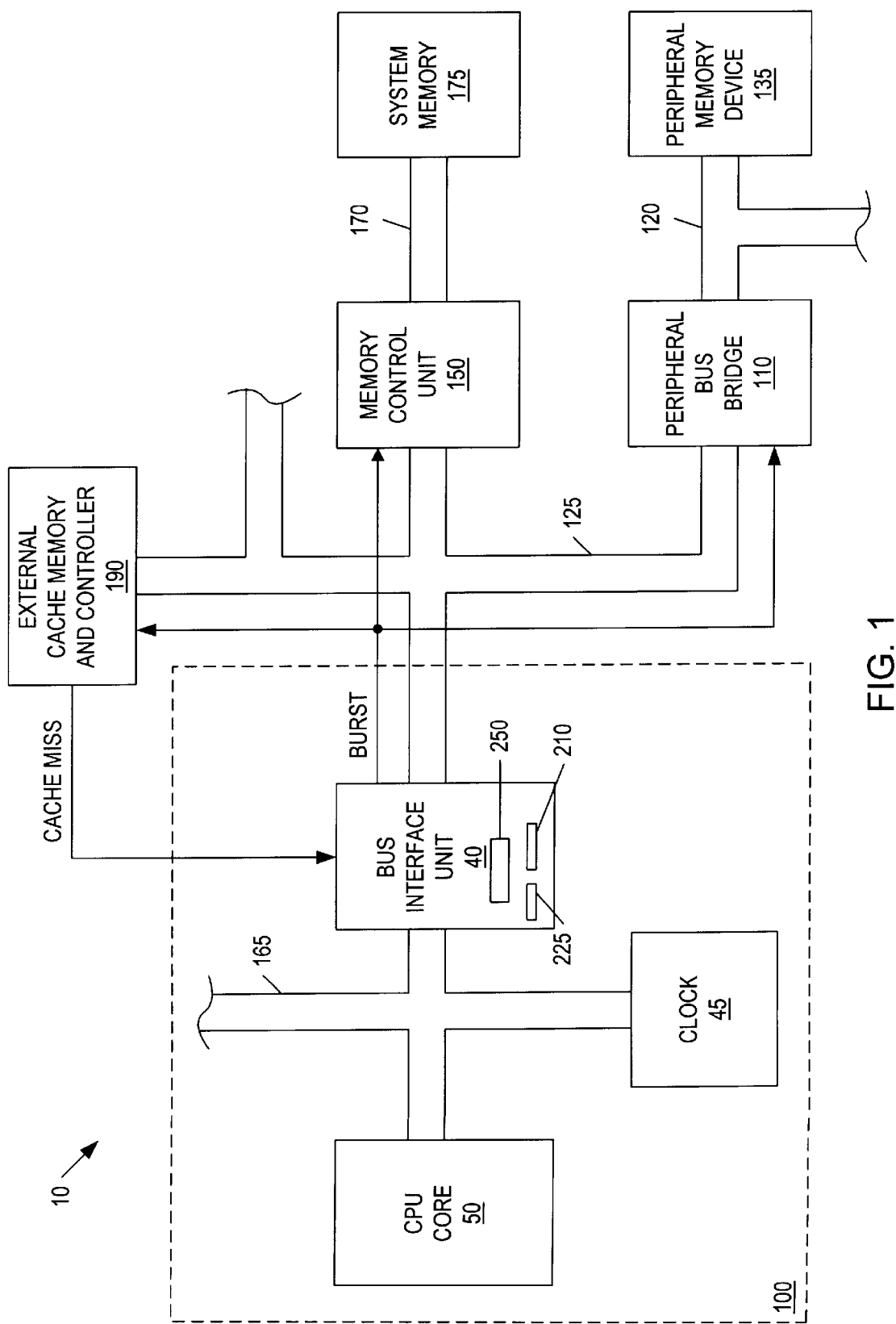
FIG. 1 depicts a functional block diagram of a computer system constructed in accordance with an exemplary embodiment of the present.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a block diagram of a general computer system 10 for implementing the present invention. The computer system 10, in accordance with generally known conventions, includes a microprocessor or "processor" 100 which functions as the brains of the computer system 10. Processor 100 preferably includes a CPU core 50 coupled to a local bus 165. Although not shown in FIG. 1, the processor 100 also may include a cache memory resident on local bus 165. CPU core 50 couples to a system bus 125 via a local bus interface unit (BIU) 40. As shown in FIG. 1, a clock 45 may also connect to the local bus 165, or alternatively, may be located on the system bus or some other peripheral bus. As one skilled in the art will understand, any of the components of the processor 100, such as clock 45, may be located externally from the processor 100 without departing from the principles of the present invention. Similarly, other components shown as external to the processor 100 in FIG. 1 may be integrated as part of microprocessor 100. As will be understood by one skilled in the art, in such a situation the system bus 125 may form part of the CPU local bus 165.

The computer system 10 also preferably includes a peripheral bus bridge 110 and a memory control unit 150, all connected to the processor 100 via system bus 125 and local bus interface 40. The peripheral bus bridge 110 provides an interface between an external peripheral bus 120 and the system bus 125 and orchestrates the transfer of data, address and control signals between these busses in accordance with known techniques. As shown in FIG. 1, memory devices 135 may exist on the peripheral bus 120. Other memory devices may couple directly to the system bus 125, such as the external cache memory and controller 190. The cache memory and controller 190 includes both a cache memory and control logic in accordance with conventional techniques.

Referring still to FIG. 1, an external system memory 175 also preferably couples to system bus 125 through memory controller 150. The memory control unit 150 of FIG. 1 couples to the system bus 125 and to a memory bus 170 to control memory transactions between system components and system memory 175. The system memory 175 typically includes banks of dynamic random access memory (DRAM) circuits. The DRAM banks, according to normal convention, comprise the working memory of the integrated processor 100. The memory bus 170, which interconnects the DRAM circuits to the memory controller 150, includes memory address lines, memory data lines, and various control lines. In accordance with the exemplary embodiment of FIG. 1, the memory control unit 150 may also connect to a read only memory (ROM) device (not shown) via the memory bus 170. The ROM device may store the BIOS (basic input/output system) instructions for the computer system. As one skilled in the art will understand, the BIOS ROM may be located elsewhere in the computer system if desired.

In its illustrated form, computer system 10 embodies a single processor, single-cache architecture. It should be understood, however, that the present invention may be adapted to multi-processor and/or multi-cache systems. It is further understood that a variety of other devices may be coupled to peripheral bus 120. The peripheral bus may comprise a PCI bus, an ISA bus, an EISA bus, or any other standard bus. Peripheral memory device 135 may be illustrative of a variety of memory devices. Exemplary memory devices include hard disk drives, floppy drives, and CD ROM units. Thus, according to normal convention, the processor 100 couples to other peripheral computer components through one or more external buses, such as system bus 125, peripheral bus 120, and memory bus 170. Various peripheral devices may reside on these busses. These peripheral devices may include memory devices, network cards or other structures which could be the target of a read or write request by the CPU core 50 or some other system component.

The CPU core 50 is illustrative of, for example, a Pentium-compatible microprocessor, with reduced instruction set computer (RISC) operations, such as the assignee's "K-5" superscalar microprocessor. The CPU local bus 165 is exemplary of a Pentium-compatible style local bus. The CPU local bus 165 includes a set of data lines, a set of address lines, and a set of control lines (not shown individually). Alternatively, the CPU core 50 and CPU local bus 165 may support other instruction set operations, without departing from the principles of the present invention.

Referring still to FIG. 1, the present invention preferably includes a cache memory and controller 190. The cache memory functions as an intermediate storage device to store recently accessed data, as long as that data is determined to be cacheable. The cache controller includes address tag and state information. The address tag indicates a physical address in system memory 175 or in external memory (such as may be represented by peripheral memory device 135, for example) corresponding to each entry within cache the memory. In accordance with normal convention, each entry within the cache memory is capable of storing a line of data. The cache controller also preferably includes an address tag and state logic circuit that contains and manages the address tag and state information, and a comparator circuit for determining whether a cache hit has occurred. Although not shown, the cache controller may include other logical elements, including for example a snoop write-back circuit that controls the write-back of dirty data within the cache memory. It will be appreciated by those skilled in the art that the cache memory and controller may contain other additional conventional circuitry to control well-known caching functions such as various read, write, update, invalidate, copy-back, and flush operations. Such circuitry may be implemented using a variety of specific circuit configurations. Examples of such specific circuit configurations may be found in a host of publications of the known prior art, including U.S. Pat. No. 5,091,875 issued to Rubinfeld on Feb. 25, 1992 and U.S. Pat. No. 5,091,876 issued to Sachs et al. on Feb. 25, 1992.

In accordance with the preferred embodiment of the present invention, the BIU 40 couples to both the local bus 165 and the system bus 125 for orchestrating the transfer of address, data and control signals between these respective busses. Referring now to FIGS. 1 and 4, the bus interface unit (BIU) 40 preferably includes a register 210 for indicating whether the adaptive burst feature is enabled. As shown in FIG. 4, register 210 preferably includes a dedicated bit, marked as bit AB. If bit AB of register 210 is enabled, then the adaptive burst feature is implemented by the BIU. If bit AB is not enabled, a fixed length burst may be used. The status of bit AB may be set as part of the system initialization, or may be subsequently activated by a system programmer. Although FIG. 4 shows register 210 as an eight bit register, one skilled in the art will understand that register 210 may implemented with a register of any size.

In accordance with the principles of the present invention, the BIU 40 monitors certain system parameters for the purpose of determining the optimal burst length for particular memory ranges or devices. Referring now to FIGS. 1, 3 and 4, the BIU preferably includes a pair of look-up tables 225,250 for assigning optimal burst lengths for particular memory ranges or components. As one skilled in the art will understand tables 225 and 250 may be combined together in a single table if the BIU is adequately programmed to define a burst length for specific latency periods. This can be done using a formula, or algorithmic definition for burst length.

Referring first to FIG. 3, look-up table 225 represents the optimal burst length for specific measured latency periods. It should be understood that the values in table 225 are merely intended to be exemplary, and should not be construed as limiting the invention to the values represented. Thus, according to the example shown in table 225, if a memory response to a CPU request requires the CPU to enter a WAIT period for 2–3 clock signals (which is generated by clock 45 in FIG. 1), then table 225 indicates that the optimal burst length is 8 bytes. Similarly, if the WAIT period for response comprises 10 clock signals, the example shown in table 225 defines an optimal burst length of 64 bytes. The values entered in table 225 may be fixed by a system designer, or may be variable. If the values in table 225 are variable, they can be varied either by a programmer, or by the system itself, based upon an algorithmic definition.

Referring now to FIG. 4, table 250 represents the actual historical values determined by the BIU 40, or associated circuitry, representing the historical time for servicing memory requests to particular address ranges. Once again, it should be understand that the values depicted in table 250 are meant only as an illustration. Table 250 may be formatted into particular address ranges, with as much granularity as desired. Thus, for example, system memory may be defined on a page by page basis, or the entire contents may be defined as a single memory range. The BIU 40 monitors addresses within the defined address ranges, and stores information in column 2 indicative of the period of response. The value in column 2 may be based upon the most current access to that memory range, or may represent an average of previous accesses. In the preferred embodiment, the unit of measurement is the number of clock signals received from clock 45 between the initial memory request, and the beginning of the response from the memory unit. As will be apparent, other units of measurements may used, as well as other definitions of the period to measure.

Once the latency value has been determined and stored in table 250, the BIU 40 (or associated circuitry) accesses the look-up table 225 to determine the optimal burst length based on the measure latency period. In the preferred embodiment, this value for burst length then is stored in column 3 of table 250. It should be understand that while "columns" of look-up table 250 are discussed, in the preferred embodiment table 250 is implemented by a memory map, or by registers. Thus, each "column" in actuality comprises a predetermined number of bits dedicated to represent values. Thus, for example, eight bits may be dedicated to represent the optimal burst length (column 3 of table 250), thus providing 256 possible values for burst length. In the preferred embodiment, if no historical information is provided for the latency of a particular address range, then preferably a default value is used for the optimal burst length.

The manner in which the system implements the adaptive burst mode feature, and the optimal burst length value of table 250 may vary. In the embodiment shown in FIG. 1, a BURST control line is provided by the BIU 40. In this exemplary embodiment, the BURST signal is asserted by the BIU 40 to indicate a burst transaction is desired. The responding memory device preferably responds by bursting data until the BURST control signal is deasserted by the BIU 40. As an alternative, the burst length may be defined by signaling between the CPU and the target memory device prior to the response of the memory device. This signaling could be transmitted over existing control, address and data lines through the use of unique combinations of signals, or additional lines could be defined specifically for this type of encoding of the burst length. Thus, in this alternative embodiment, the BIU 40 could signal the target device that a burst transaction is desired of x bytes. As yet another alternative, the BIU 40 could communicate to the target memory device that a burst transaction is desired, and the associated memory control unit (or bus bridge) would then be responsible for defining the optimal burst length, based on similar criteria monitored by the bus interface unit in the embodiment discussed above. Thus, the memory device would be responsible for monitoring the response times for various address ranges and providing that information to the CPU at the beginning of a cycle. In response, the BIU would then determine the optimal burst length, based on the concepts described in tables 225 and 250.

As an alternative to the use of the tables depicted in FIGS. 3 and 4, the elapsed time period from the start of a memory cycle can be monitored by the BIU 40. If the elapsed time exceeded a historical or programmed limit, then the BIU would assume that the address resulted in a cache miss of the cache memory 190 (or any other cache in the system). In response to this assumption, the BIU would increase the burst length to amortize the higher overhead involved in the memory access over a larger number of bytes. As an alternative to measuring the elapsed time period, the BIU may be configured to monitor a cache miss signal from the cache memory 190. If the cache miss signal was received (as shown in FIG. 1), then the BIU 40 would increase the burst length.

As another alternative, the nature of the program flow can be monitored. If, for example, an interrupt signal is generated which results in a miss of the internal cache in the processor 100, then the BIU sets the burst length longer, anticipating that the memory accesses will be to a different location than those previously cached.

The present invention also contemplates the possibility of changing the length of a burst during a burst transaction, if a memory request with a higher priority appears at the BIU 40. Thus, in this embodiment, and referring again to FIG. 1, the BIU 40 includes a mechanism, such as a register, for assigning priority levels to requests from particular devices. If the BIU 40 is acting as a bus arbiter, and a request is made to a memory location on the system bus 125 by an external bus master, the BIU 40 preferably responds by asserting the BURST signal to implement an optimal burst length transfer. If during that transaction, the CPU core 50 makes a memory request, the BIU 40 may provide an early termination of the existing burst cycle by deasserting the BURST signal, thus enabling the BIU 40 to process the memory request of the CPU core 50.

Numerous variations and modifications will become apparent to those skilled in the art once the above disclosure is fully appreciated. It is intended that the following claims be interpreted to embrace all such variations and modifications.

What is claimed is:

1. A system for providing adaptive burst lengths of data, comprising:

a CPU core coupled to a local bus;

a bus interface unit coupled between said local bus and a system bus, wherein said bus interface unit is configured to receive a memory request from the CPU core via the local bus and to perform a memory operation via said system bus in response to said memory request;

a memory device coupled to said system bus, wherein said memory device is configured to respond to said memory operation;

wherein said bus interface unit is configurable to:
      use a stored value maintained in the bus interface unit to control a burst length for the memory operation;
      measure a response time of said memory device during said memory operation; and
      modify the stored value used to control the burst length for the memory operation dependent upon the response time maintain information correlating: (i) address ranges of the memory device, (ii) values indicative of responsive times of memory operations comprising memory addresses falling within the address ranges of the memory device, and (iii) burst lengths to be used during memory operations comprising memory addresses falling within the address ranges of the memory device.

2. The system as in claim 1, wherein said bus interface unit comprises a look-up table correlating: (i) values indicative of response times of memory operations comprising memory addresses falling within the address ranges of the memory device, and (ii) burst lengths to be used during memory operations comprising memory addresses falling within the address ranges of the memory device.

3. The system as in claim 2, wherein the burst lengths within the look-up table are determined by a programmer.

4. The system as in claim 2, wherein the memory device is coupled to a peripheral bus.

5. The system as in claim 1, wherein said bus interface unit is configured to assert a control signal indicative of the burst length during the memory operation.

6. The system as in claim 5, wherein the bus interface unit is configured to deassert the control signal to end the memory operation.

7. The system as in claim 1, wherein the memory device comprises the system memory.

8. The system as in claim 1, wherein the memory device comprises a cache memory.

9. A method for selecting a burst length for a memory sub-system, sub-system having a plurality of memory locations defining a plurality of contiguous ranges of addresses, the method comprising:

determining a response time for each of the plurality of contiguous ranges of addresses of the memory sub-system during a memory operation; and selecting a burst length for each of the plurality of contiguous ranges of addresses of the memory sub-system dependent upon the response time for each of the plurality of contiguous ranges of addresses.

10. The method as in claim 9, wherein a first burst length is selected if the response time is less than or equal to a predetermined value, and wherein a second burst length is selected if the response time is greater than the predetermined value.

11. The method as in claim 9, wherein the response time contributes to an average response time for the memory sub-system, and wherein the average response time for the memory sub-system is used to select the burst length for the memory subsystem.

* * * * *